United States Patent [19]

FitzGerald

[11] Patent Number: 5,002,085
[45] Date of Patent: Mar. 26, 1991

[54] LOW PRESSURE NON-FRAGMENTING RUPTURE DISKS

[75] Inventor: John G. FitzGerald, Limerick, Ireland

[73] Assignee: BS&B Safety Systems, Inc., Tulsa, Okla.

[21] Appl. No.: 478,356

[22] Filed: Feb. 12, 1990

[51] Int. Cl.$^5$ ............................................. F16K 17/16
[52] U.S. Cl. .................... 137/68.1; 220/89.1
[58] Field of Search ...................... 137/68.1; 220/89 A

[56] References Cited

U.S. PATENT DOCUMENTS

| | | | |
|---|---|---|---|
| 2,224,748 | 12/1940 | Sauer | 220/89 A |
| 2,548,744 | 4/1951 | Simms | 220/89 A |
| 2,868,412 | 1/1959 | Coffman | 220/89 A |
| 3,484,817 | 12/1969 | Wood | 220/89 A |
| 3,704,807 | 12/1972 | Lidgard | 137/68.1 X |
| 3,834,580 | 9/1974 | Ludwig et al. | 220/89 A |
| 4,119,236 | 10/1978 | Shaw et al. | 137/68.1 X |
| 4,122,595 | 10/1978 | Wood et al. | 29/424 |
| 4,207,913 | 6/1980 | Fike, Jr. | 137/68.1 |
| 4,278,181 | 7/1981 | Wood et al. | 137/68.1 X |
| 4,404,982 | 9/1983 | Ou | 137/68.1 |
| 4,434,905 | 3/1984 | Ou et al. | 137/68.1 X |
| 4,441,350 | 4/1984 | Short et al. | 72/55 |
| 4,479,587 | 10/1984 | Mundt et al. | 220/89 A |

Primary Examiner—John Rivell
Attorney, Agent, or Firm—Laney, Dougherty, Hessin & Beavers

[57] ABSTRACT

Low pressure, non-fragmenting rupture disks and assemblies including such disks are provided. The rupture disks are each basically comprises of a non-metallic rupture member having one or more lines of weakness formed by indentations therein which define blow-out portions in the rupture member. The blow-out portions are moved outwardly upon rupture of the rupture member along the lines of weakness, but remain attached to the rupture member by non-weakened portions thereof. A non-metallic reinforcing member is attached to the rupture member for preventing tearing of the non-weakened portions of the rupture member.

15 Claims, 2 Drawing Sheets

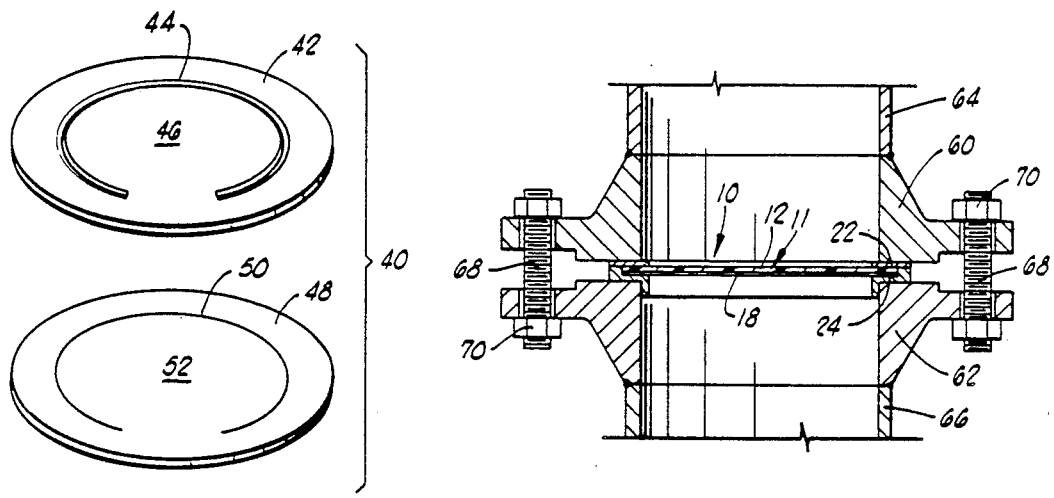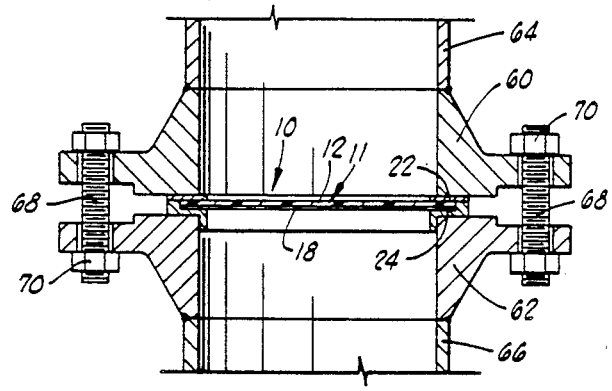

LOW PRESSURE NON-FRAGMENTING RUPTURE DISKS

BACKGROUND OF THE INVENTION

1. Field of the Invention

The present invention relates generally to low pressure non-fragmenting rupture disks and assemblies, and more particularly, to non-metallic rupture disk structures having one or more lines of weakness formed by indentations defining blow-out portions therein.

2. Description of the Prior Art

A variety of fluid pressure relief apparatus of the rupturable type have been developed and used heretofore. Such apparatus have generally included a metallic rupture disk which is supported between a pair of supporting members or flanges which are turn connected in a relief connection of a vessel or system containing fluid pressure. When the fluid pressure within the vessel or system exceeds the design rupture pressure of the rupture disk, rupture occurs causing pressurized fluid to be relieved from the vessel or system.

Metal rupture disks have heretofore included one or more scores on a surface thereof which create lines of weakness therein so that upon rupture the disks tear along the lines of weakness. Generally, the lines of weakness define one or more blow-out portions which remain attached to the disks at unscored areas where the disks rupture. Examples of scored metal rupture disks are described in U.S. Pat. No. 3,005,573 to Dodson et al. dated Oct. 10, 1961 (conventional scored rupture disk) and U.S. Pat. No. 3,484,817 to Wood dated Dec. 16, 1969 (scored reversed buckling rupture disk). As described in detail in such patents, the scores formed in the rupture disks are in the form of continuous grooves or indentations in the metal forming the disks.

While non-fragmenting scored metallic rupture disks of both the conventional and reverse buckling types have been utilized successfully heretofore, such use has generally been limited to applications where the fluid pressure at which the disks are designed to rupture is not extremely low. That is, scored metal rupture disks have been unsuitable in extremely low pressure applications, i.e., applications where the disks are designed to rupture at differential pressures in the range of from about 2.5 psi to about 10.0 psi. The reason for such unsuitability is that the metal rupture disks must be extremely thin in order to rupture at such low pressure differentials making the scoring of the disks impossible or impractical.

Thus, there is a need for rupture disks and assemblies containing such disks which are suitable for use in extremely low pressure applications and which are non-fragmenting upon rupture.

SUMMARY OF THE INVENTION

The present invention fulfills the need mentioned above by providing non-metallic rupture disks and assemblies wherein indentations are formed in the disks which create lines of weakness defining blow-out portions therein. Upon rupture, the blow-out portions remain attached to the disks at unscored areas and fragmentation of the disks is prevented.

The rupture disks of the present invention are each basically comprised of a non-metallic rupture member having one or more lines of weakness formed by indentations therein which define one or more blow-out portions in the rupture member. Upon rupture of the rupture member along the lines of weakness, the blow-out portions are moved outwardly, but remain attached to the rupture member at non-weakened portions thereof. A non-metallic reinforcing member is attached to the rupture member for preventing tearing of the non-weakened portions of the rupture member.

In a preferred embodiment, the non-metallic rupture member includes radially extending indentations therein which form lines of weakness defining sector-shaped blow-out portions. The reinforcing member is bonded to the rupture member and includes slits therein which generally correspond in location and length with the lines of weakness in the rupture member.

It is, therefore, a general object of the present invention to provide low pressure non-fragmenting rupture disks and assemblies.

A further object of the present invention is the provision of non-metallic non-fragmenting rupture disks which can be utilized in gas or liquid service at extremely low pressures.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 5 is an exploded perspective view of an alternate form of rupture member and reinforcing member.

FIG. 6 is a side cross-sectional view of the low pressure non-fragmenting rupture disk assembly of the present invention clamped between a pair of bolted flanges.

FIG. 7 is a cross-sectional view similar to FIG. 6, but illustrating the rupture disk assembly after rupture.

Description of Preferred Embodiments

Figure 1:
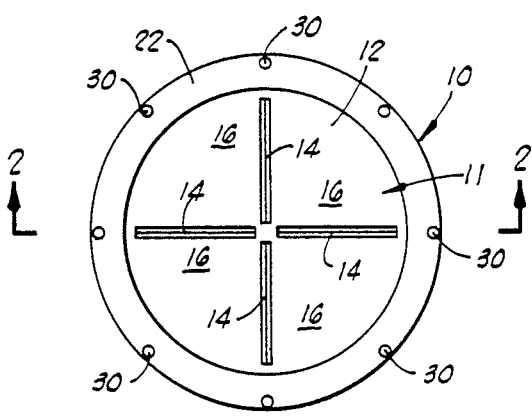
FIG. 1 is a top plan view of a low pressure nonfragmenting rupture disk assembly of the present invention.
Figure 2:
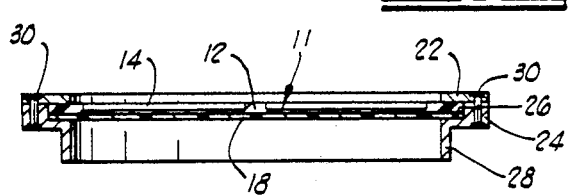
FIG. 2 is a cross-sectional view taken along line 2—2 of FIG. 1.
Figure 3:
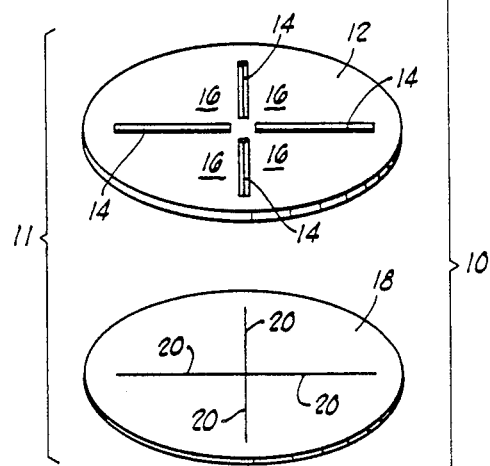
FIG. 3 is an exploded perspective view of the assembly of FIGS. 1 and 2.
Figure 3:
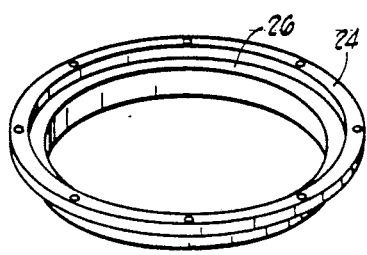

Referring now to the drawings and particularly to FIGS. 1–3, a low pressure non-fragmenting rupture disk assembly of the present invention is illustrated and generally designated by the numeral 10. The assembly 10 includes a non-metallic circular rupture disk 11 comprised of a rupture member 12 having four radial indentations 14 formed in a side thereof which extend from the center of the rupture member 12 outwardly to near the periphery thereof. The indentations 14 can be formed in the rupture member 12 in various ways, but a presently preferred technique is to stamp the rupture member 12 with a relatively sharp blade whereby continuous indentations, i.e., depressions, are formed in one side thereof. The indentations 14 form lines of weakness in the rupture member 12 along which the rupture member 12 tears when ruptured as a result of fluid pressure exerted thereon. The lines of weakness formed by the indentations 14 define sector-shaped blow-out portions 16 in the rupture member 12 which are moved outwardly upon rupture, but which remain attached to the rupture member 12 by non-weakened portions thereof, i.e., the portions between the outer ends of the indentations 14.

A variety of non-metallic materials can be utilized in forming the rupture member 12, so long as the materials have integrity and resistance to rupture when low pressures are exerted thereon. Suitable such materials include a variety of plastics, resins and other materials such as graphite which is presently preferred. A rupture member 12 formed of graphite foil having a diameter of 1½ inches, a thickness of 0.039 inch and having indentations 14 formed therein approximately 0.10 inch wide, 0.75 inch long and 0.06 inch deep ruptures at a differential pressure in the range of from about 2.5 psi to about 3.5 psi.

In order to prevent the rupture member 12 from fragmenting when ruptured, i.e., to prevent the sector-shaped portions 16 formed as a result of tearing along the lines of weakness created by the indentations 14 from fragmenting or tearing away, a non-metallic reinforcing member 18 (FIGS. 2 and 3) is attached to a side of the rupture member 12. The reinforcing member 18 includes slits 20 formed therein which generally correspond in number, location and length with the lines of weakness formed in the rupture member 12 by the indentations 14. That is, a slit 20 in the reinforcing member 18 is aligned with each of the lines of weakness formed by the indentations 14 in the rupture member 12, and the support member 18 is attached to the side of the rupture member 12 opposite the side thereof in which the indentations 14 are formed. The presence of the support member 18 attached to the rupture member 12 does not increase the pressure differential required to rupture the rupture member 12 because the slits 20 are connected at the center of the reinforcing member 18, and no resistance to rupture is provided by the reinforcing member 18. However, the non-weakened portions of the rupture member 12 are reinforced and prevented from tearing or otherwise fragmenting by the reinforcing member 18.

The reinforcing member 18 can be formed of a variety of non-metallic sheet materials which have sufficient tensile strength to resist tearing upon the rupture of the rupture member 12. Films formed of plastic materials such as polyethylene, polyurethane, polyester and the like are particularly suitable. A polyester adhesive backed film is presently preferred.

The reinforcing member 18 is preferably bonded to the rupture member 12 by an adhesive. Acrylic adhesives are particularly suitable for this purpose due to their high strength, flexibility and temperature resistance. For the 1½ inch graphite rupture member having a thickness of about 0.039 inch described above, a polyester film reinforcing member 18 having a thickness of about 0.031 inch bonded to the rupture member 12 by an acrylic adhesive effectively prevents the tearing or fragmentation of the rupture member 12.

Figure 4:
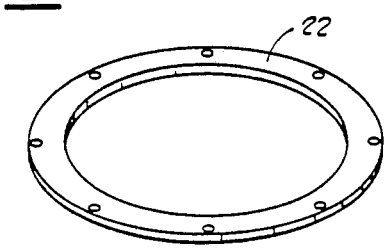
FIG. 4 is a perspective view of an alternate form of reinforcing member.
Figure 4:
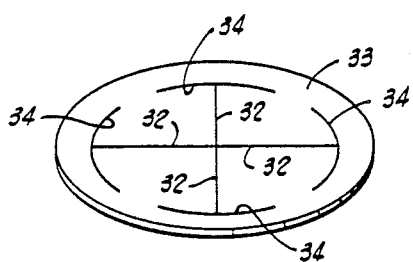

Still referring to FIGS. 1–3, the rupture disk 11 formed of the rupture member 12 and the reinforcing member 18 attached thereto is clamped between a pair of annular support members 22 and 24. While the annular support members 22 and 24 can take various forms, one of the support members, i.e., the support member 24, preferably includes an annular recess 26 formed therein for receiving a peripheral portion of the rupture disk 11. The support member 24 also preferably includes a cylindrical portion 28 attached thereto for aligning the assembly 10 within and between a pair of conventional bolted flanges when clamped therebetween as illustrated in FIGS. 4 and 5. While the support members 22 and 24 can be formed of various materials, they are preferably formed of metal and are held together with the rupture disk 11 clamped therebetween by a plurality of spot welds 30.

Referring now to FIG. 4, an alternate form of reinforcing member designated by the numeral 33 is illustrated. The reinforcing member 33 includes four radial slits 32 which are identical to the slits 20 of the reinforcing member 18. In addition, the reinforcing member 33 includes four arcuate slits 34 formed therein, each of which is positioned transversely to and intersects with an outer end of one of the radial slits 32. The arcuate slits 34 function to prevent tearing of the reinforcing member 33 when rupture of the rupture member to which it is attached occurs.

As will be understood by those skilled in the art, the rupture member 12 can include a variety of indentation patterns forming lines of weakness which define various numbers and shapes of blow-out portions therein. For example, more or less than four radial indentations 14 can be included in the rupture member 12 whereby more or less than four sector-shaped blow-out portions 16 are defined therein. In every case, the reinforcing member 18 will include slits formed therein corresponding in number, location and length with the lines of weakness formed by the indentations. As will be further understood, the indentations can include interruptions whereby they have the appearance of dashed lines rather than continuous lines.

Referring now to FIG. 5, an alternate form of rupture disk of the present invention, generally designated by the numeral 40 is illustrated. The rupture disk 40 is identical to the rupture disk 11 except that instead of a plurality of radial indentations forming sector-shaped blow-out portions, the rupture disk 40 includes a rupture member 42 having a single indentation 44 therein. The indentation 44 is arcuate in shape forms a line of weakness which defines a substantially circular blow-out portion 46 in the rupture member 42. A reinforcing member 48 is attached to one side of the rupture member 42 which includes an arcuate slit formed therein generally corresponding in location and length with the line of weakness formed by the indentation 44 in the rupture member 42. As will be understood, upon rupture, the substantially circular blow-out portion 46 is opened in a fashion similar to the top of a tin can, but remains attached to the rupture member 42 by the non-weakened area between the ends of the indentation 44. The corresponding circular portion 52 of the reinforcing member 48 opens with the blow-out portion 46 of the rupture member 42 and remains attached thereto whereby tearing or fragmentation of the rupture member 42 does not result.

Referring now to FIGS. 6 and 7, the rupture disk assembly 10 is illustrated clamped between a pair of bolted flanges 60 and 62. Typically, the flange 60 is welded to a conduit 64 which is in turn connected to a pressure vessel or system containing pressurized fluid (not shown) which is to be protected from over-pressure by the assembly 10. The outlet flange 62 is connected to a conduit 66 which, depending upon the particular type of pressurized fluid involved, may conduct relieved fluid through the assembly 10 to an atmospheric vent or to a vessel or other location for processing or disposing of the fluid (not shown). The flanges 60 and 62 are clamped together with the rupture disk assembly 10 therebetween by a plurality of studs 68 and nuts 70.

In operation of the assembly 10 and the rupture disk 11 thereof, fluid pressure is exerted on the rupture disk 11 by way of the conduit 64 and inlet flange 60. As long as the pressure level is below the design rupture pressure of the rupture disk 11, the rupture disk 11 remains intact. However, when the fluid pressure exerted on the rupture disk 11 equals or exceeds the design rupture pressure, the rupture member 12 tears along the lines of weakness formed by the indentations 14 therein whereby the sector-shaped blowout portions 16 defined by the lines of weakness are moved outwardly as shown in FIG. 7. Pressurized fluid flows through the assembly 10 and excess fluid pressure within the pressure vessel or system being protected is relieved as a result. The reinforcing member 18 attached to the rupture member 12 prevents all or parts of the sector-shaped blowout portions 16 from tearing away from the rupture disk 11. Because the rupture member 12 is formed of a non-metallic material, it can have a thickness sufficient for the indentations 14 to be formed therein, but still rupture at an extremely low pressure, i.e., a pressure differential exerted across the rupture disk 11 in the range of from about 2.5 psi to about 10.0 psi.

Thus, the present invention is well adapted to carry out the objects and attain the ends and advantages mentioned as well as those inherent therein. While numerous changes in the construction and arrangement of parts may be made by those skilled in the art, such changes are encompassed within the spirit of this invention as defined by the appended claims.

What is claimed is:

1. A low pressure non-fragmenting rupture disk comprising:
   a non-metallic rupture member having one or more lines of weakness formed by indentations therein, said lines of weakness defining at least one blow-out portion in said rupture member which is moved outwardly upon rupture of said rupture member along said lines of weakness, but which remains attached to said rupture member by a non-weakened portion thereof; and
   a non-metallic reinforcing member including slits formed therein which generally correspond in number, location and length with said lines of weakness in said rupture member attached to said rupture member for preventing tearing of said non-weakened portion thereof.

2. The rupture disk of claim 1 wherein said reinforcing member is bonded to one side of said rupture member by an adhesive.

3. The rupture disk of claim 1 wherein said rupture member includes four radial indentations forming lines of weakness therein which define four sector-shaped blow-out portions, and said reinforcing member includes four corresponding radial slits therein.

4. The rupture disk of claim 3 wherein said reinforcing member is further characterized to include four arcuate slits formed therein, each positioned transversly to and intersecting an outer end of one of said radial slits.

5. The rupture disk of claim 1 wherein said rupture member includes one or more arcuate indentations forming a line of weakness defining a single substantially circular blow-out portion, and said reinforcing member includes a single corresponding circular slit therein.

6. The rupture disk of claim 1 wherein said non-metallic rupture member is comprised of graphite.

7. The rupture disk of claim 6 wherein said non-metallic support member is comprised of polyester film.

8. The rupture disk of claim 7 wherein said support member is bonded to said rupture member by an acrylic adhesive.

9. A low pressure non-fragmenting rupture disk assembly comprising:
   a rupture disk comprised of a non-metallic rupture member having one or more lines of weakness formed by indentations therein, said lines of weakness defining at least one blow-out portion in said rupture member which is moved outwardly upon the rupture of said rupture member along said lines of weakness, but which remains attached to said rupture member by a non-weakened portion thereof, and a non-metallic reinforcing member including slits formed therein which generally correspond in number, location and length with said lines of weakness in said rupture member attached to said rupture member for preventing tearing of said non-weakened portion thereof; and
   inlet and outlet annular supporting members adapted to be sealingly clamped together with said rupture disk therebetween.

10. The rupture disk assembly of claim 9 wherein said rupture member is comprised of graphite.

11. The rupture disk assembly of claim 10 wherein said reinforcing member is comprised of polyester film.

12. The rupture disk assembly of claim 11 wherein said reinforcing member is bonded to said rupture member by an acrylic adhesive.

13. The rupture disk assembly of claim 9 wherein said rupture member includes radially extending indentations forming lines of weakness which define sector-shaped blow-out portions therein, and said reinforcing member includes corresponding radially extending slits therein.

14. The rupture disk assembly of claim 13 wherein said reinforcing member is further characterized to include arcuate slits formed therein, each positioned transversly to and intersecting an outer end of one of said radially extending slits.

15. The rupture disk assembly of claim 9 wherein said rupture member includes one or more arcuate indentations forming a line of weakness defining a single substantially circular blow-out portion therein, and said reinforcing member includes a single corresponding circular slit therein.

* * * * *